United States Patent
Hanes

(10) Patent No.: US 10,863,562 B2
(45) Date of Patent: Dec. 8, 2020

(54) PERIPHERAL DEVICE PAIRING

(71) Applicant: HEWLETT-PACKARD DEVELOPMENT COMPANY, L.P., Houston, TX (US)

(72) Inventor: David H. Hanes, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/753,911

(22) PCT Filed: Aug. 20, 2015

(86) PCT No.: PCT/US2015/046007
§ 371 (c)(1),
(2) Date: Feb. 20, 2018

(87) PCT Pub. No.: WO2017/030584
PCT Pub. Date: Feb. 23, 2017

(65) Prior Publication Data
US 2018/0249519 A1    Aug. 30, 2018

(51) Int. Cl.
| H04W 76/14 | (2018.01) |
| H04W 76/10 | (2018.01) |
| H04W 8/00 | (2009.01) |
| G06F 13/10 | (2006.01) |
| H04W 4/80 | (2018.01) |

(52) U.S. Cl.
CPC .......... *H04W 76/14* (2018.02); *G06F 13/102* (2013.01); *H04W 8/005* (2013.01); *H04W 76/10* (2018.02); *H04W 4/80* (2018.02)

(58) Field of Classification Search
CPC ..... H04W 76/14; H04W 76/10; H04W 8/005; H04W 4/80; G06F 13/102
USPC ........................................................ 455/41.2
See application file for complete search history.

(56) References Cited

U.S. PATENT DOCUMENTS

| 7,463,894 B2 * | 12/2008 | Fano | H04W 8/005 |
| | | | 455/414.1 |
| 7,953,400 B2 | 5/2011 | Lee et al. | |
| 8,243,301 B2 * | 8/2012 | Ogura | G06F 3/1208 |
| | | | 358/1.14 |

(Continued)

FOREIGN PATENT DOCUMENTS

| CN | 102118186 A | 7/2011 |
| CN | 102857267 A | 1/2013 |

(Continued)

OTHER PUBLICATIONS

Bluetooth Data Module Command Reference & Advanced Information User's Guide, Mar. 26, 2013, pp. 1-83, Roving Networks.

*Primary Examiner* — Jinsong Hu
*Assistant Examiner* — Rui M Hu
(74) *Attorney, Agent, or Firm* — Brooks Cameron & Huebsch PLLC

(57) ABSTRACT

Examples monitor a communication network to detect a peripheral device. Examples pair with the peripheral device responsive to detecting the peripheral device. Examples generate a peripheral application query corresponding to the peripheral device responsive to pairing with the peripheral device, and examples query a peripheral application server with the peripheral application query to retrieve a peripheral application corresponding to the peripheral device.

13 Claims, 8 Drawing Sheets

(56) References Cited

U.S. PATENT DOCUMENTS

| | | | |
|---|---|---|---|
| 8,442,549 B2 | 5/2013 | Niranjan et al. | |
| 8,542,834 B1 | 9/2013 | Feikis et al. | |
| 8,699,952 B2* | 4/2014 | Yeung | H04W 84/18 455/41.2 |
| 8,774,041 B2* | 7/2014 | Akay | H04W 52/0245 370/252 |
| 8,830,496 B2* | 9/2014 | Itogawa | G06F 3/1207 358/1.14 |
| 9,436,424 B1* | 9/2016 | Khafizova | G06F 3/1204 |
| 9,766,849 B2* | 9/2017 | Kim | H04N 21/4436 |
| 2003/0038965 A1* | 2/2003 | Simpson | G06K 15/005 358/1.15 |
| 2004/0004735 A1* | 1/2004 | Oakeson | G06F 3/1226 358/1.15 |
| 2006/0227371 A1* | 10/2006 | Roksz | G06F 21/608 358/1.15 |
| 2006/0252411 A1* | 11/2006 | Huckins | H04W 12/08 455/411 |
| 2007/0033287 A1* | 2/2007 | Kiyose | H04L 63/10 709/229 |
| 2008/0270814 A1* | 10/2008 | Starr | G06F 1/3203 713/323 |
| 2009/0093215 A1* | 4/2009 | Eisenbach | H04W 12/02 455/41.2 |
| 2009/0286479 A1* | 11/2009 | Thoresson | H04M 1/7253 455/41.3 |
| 2009/0319673 A1 | 12/2009 | Peters | |
| 2011/0019228 A1* | 1/2011 | Uchikawa | H04N 1/32534 358/1.15 |
| 2011/0098000 A1 | 4/2011 | Morris | |
| 2011/0230139 A1* | 9/2011 | Nakahara | H04W 88/02 455/41.2 |
| 2012/0190301 A1* | 7/2012 | Hart | H04M 1/7253 455/41.2 |
| 2012/0258665 A1* | 10/2012 | Sip | H04W 84/18 455/41.2 |
| 2013/0003630 A1 | 1/2013 | Xhafa et al. | |
| 2013/0031261 A1* | 1/2013 | Suggs | H04L 63/083 709/228 |
| 2013/0141756 A1* | 6/2013 | Miller | G06F 3/1236 358/1.15 |
| 2013/0267277 A1* | 10/2013 | Okigami | H04N 1/2338 455/557 |
| 2014/0013014 A1* | 1/2014 | Huang | G06F 11/3089 710/19 |
| 2014/0038560 A1* | 2/2014 | Lee | H04M 3/42263 455/411 |
| 2014/0068717 A1* | 3/2014 | Mayes | G06F 21/44 726/3 |
| 2014/0073244 A1* | 3/2014 | Ko | H04L 67/34 455/41.1 |
| 2014/0127994 A1* | 5/2014 | Nightingale | H04W 4/80 455/41.1 |
| 2014/0176991 A1* | 6/2014 | Yun | G06F 3/0482 358/1.15 |
| 2014/0222864 A1* | 8/2014 | Runge | G06F 16/2471 707/770 |
| 2014/0342670 A1* | 11/2014 | Kang | H04M 1/7253 455/41.2 |
| 2014/0351476 A1* | 11/2014 | Huang | H04L 67/16 710/303 |
| 2014/0378058 A1* | 12/2014 | Decuir | H04W 4/80 455/41.2 |
| 2015/0038086 A1* | 2/2015 | Kim | H04L 63/08 455/41.3 |
| 2015/0133056 A1* | 5/2015 | Kang | H02J 50/00 455/41.2 |
| 2015/0147968 A1* | 5/2015 | Friedman | H04W 76/14 455/41.2 |
| 2015/0304828 A1* | 10/2015 | Varoglu | H04W 4/16 455/414.1 |
| 2016/0044442 A1* | 2/2016 | Pacelli | G06Q 20/3278 455/41.1 |
| 2016/0063847 A1* | 3/2016 | Hawkins | G08B 21/0277 340/539.11 |
| 2016/0080943 A1* | 3/2016 | Ives-Halperin | H04L 63/0861 713/168 |
| 2016/0269962 A1* | 9/2016 | Takahashi | G06F 3/1236 |
| 2016/0277877 A1* | 9/2016 | Tsunoda | H04W 84/18 |
| 2016/0360477 A1* | 12/2016 | Saeki | G06F 3/1226 |
| 2017/0134609 A1* | 5/2017 | Park | G06Q 30/02 |
| 2018/0227443 A1* | 8/2018 | Sakai | H04W 8/005 |
| 2018/0270340 A1* | 9/2018 | Ahmad | H04M 1/72527 |
| 2019/0191074 A1* | 6/2019 | Ikeda | H04W 4/80 |

FOREIGN PATENT DOCUMENTS

| | | |
|---|---|---|
| EP | 2 230 605 | 9/2010 |
| KR | 10-2009-0124588 A | 12/2009 |
| WO | WO-03/012577 | 2/2003 |

* cited by examiner

PERIPHERAL DEVICE PAIRING

BACKGROUND

For some computing devices, peripheral devices may be used to facilitate interface with the computing device. In addition, some computing devices may communicate data with computing devices. Examples of a peripheral device include, for example, a keyboard, mouse, touchscreen, and/or other such devices.

DRAWINGS

Figure 1A:
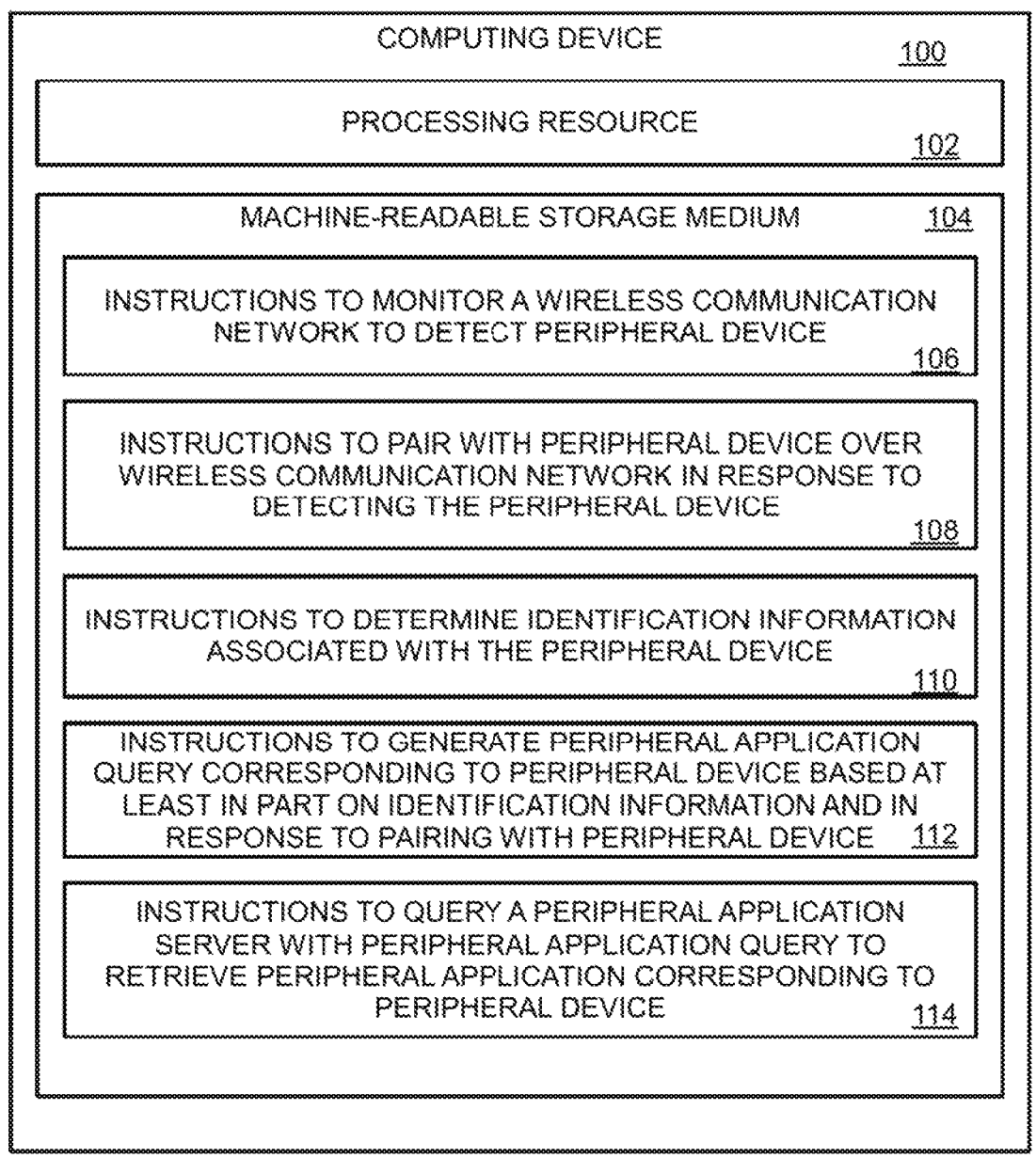
FIG. 1A is a block diagram of an example computing device.

Throughout the drawings, identical reference numbers designate similar, but not necessarily identical, elements. Moreover the drawings provide examples and/or implementations consistent with the description; however, the description is not limited to the examples and/or implementations provided in the drawings.

DESCRIPTION

Generally, a computing device may connect to one or more peripheral devices that facilitate interface with the computing device. Some example peripheral devices generally used with computing devices include a keyboard, a mouse, a speaker, a microphone, a headset, a touchscreen, an image scanner, a printing device, a projector, a graphic tablet, a smartphone, etc. As technology improves, the connection between peripheral devices and a computing device have increasingly been implemented over wireless communication networks. In addition, technological advances have led to the networking of various home-centric devices (often referred to as smart-home devices), such that examples of peripheral devices include appliances, fixtures, televisions, sensors, power outlets, light-bulbs, control panels, heating and cooling equipment, thermostats, solar panels, water filters, etc.

In such examples, connecting a peripheral device and a computing device may be referred to as pairing. Generally, pairing refers to establishing a connection between two devices, such as a computing device and a peripheral device. When a connection is established such that the two devices may communicate data therebetween, the devices may be referred to as being paired. As a particular example, a computing device may be paired with a wireless mouse. In this particular example, a user may input data to the computing device through operation of the wireless mouse, where the wireless mouse may translate movement of the mouse and actuation of one or more buttons into user input data that may be communicated to the computing device.

Another example may be a smartphone (or other such portable computing device) that is paired to a wireless headset, where the wireless headset may receive audio data from the smartphone to output with a speaker of the headset. The wireless headset may capture audio with a microphone of the headset, encode the captured audio to generate audio input data, and communicate the encoded audio input data to the smartphone.

As another example, a tablet computing device (or other such portable computing device) may be paired with a smart home device, such as a networking capable light-bulb (a smart light-bulb). In this example, the tablet computing device may interface with the smart home device to control the smart home device via user input at the tablet computing device (e.g., turn the smart light-bulb on/off). Similarly, the smart home device may communicate relevant data to the tablet computing device (e.g., power usage data for the smart light-bulb example).

To operate with some peripheral devices that connect over wireless communication networks, a peripheral application corresponding to a peripheral device may be loaded/installed/executed on a computing device. As illustrated by the example peripheral devices described above, the types of data and the format of such data generally varies based on the type and vendor/manufacturer of the peripheral device. Generally, a corresponding peripheral application facilitates interface between the peripheral device and the computing device. For some examples of a peripheral device, a peripheral application may be distributed with the peripheral device by storing the peripheral application in a machine-readable medium. In other examples of a peripheral device, a user may be provided with a resource link (such as a Universal Resource Locator) at which a peripheral application may be located for loading on a connected computing device. In these examples, further user action may be needed after pairing with a peripheral device before the peripheral device may be operable with the computing device.

Examples provided herein generally facilitate dynamic pairing of a computing device with a peripheral device. In particular, examples may monitor a communication network to detect a peripheral device. The computing device may automatically pair with a detected peripheral device, and the computing device may dynamically retrieve and execute a peripheral application corresponding to the peripheral device. Therefore, examples may streamline a pairing and configuration process for a computing device and a peripheral device. Generally, dynamic pairing generally refers to the automated implementation by which a particular peripheral device is paired to a computing device based on characteristics (such as a vendor and product type) of the peripheral device. In particular, examples may dynamically generate a peripheral device specific peripheral application query by which to facilitate retrieval of a peripheral device specific peripheral application. Dynamic generation of the peripheral application query generally refers to the automated generation of the query based on characteristics of the peripheral device, such as identification information associated with the peripheral device.

Figure 1B:
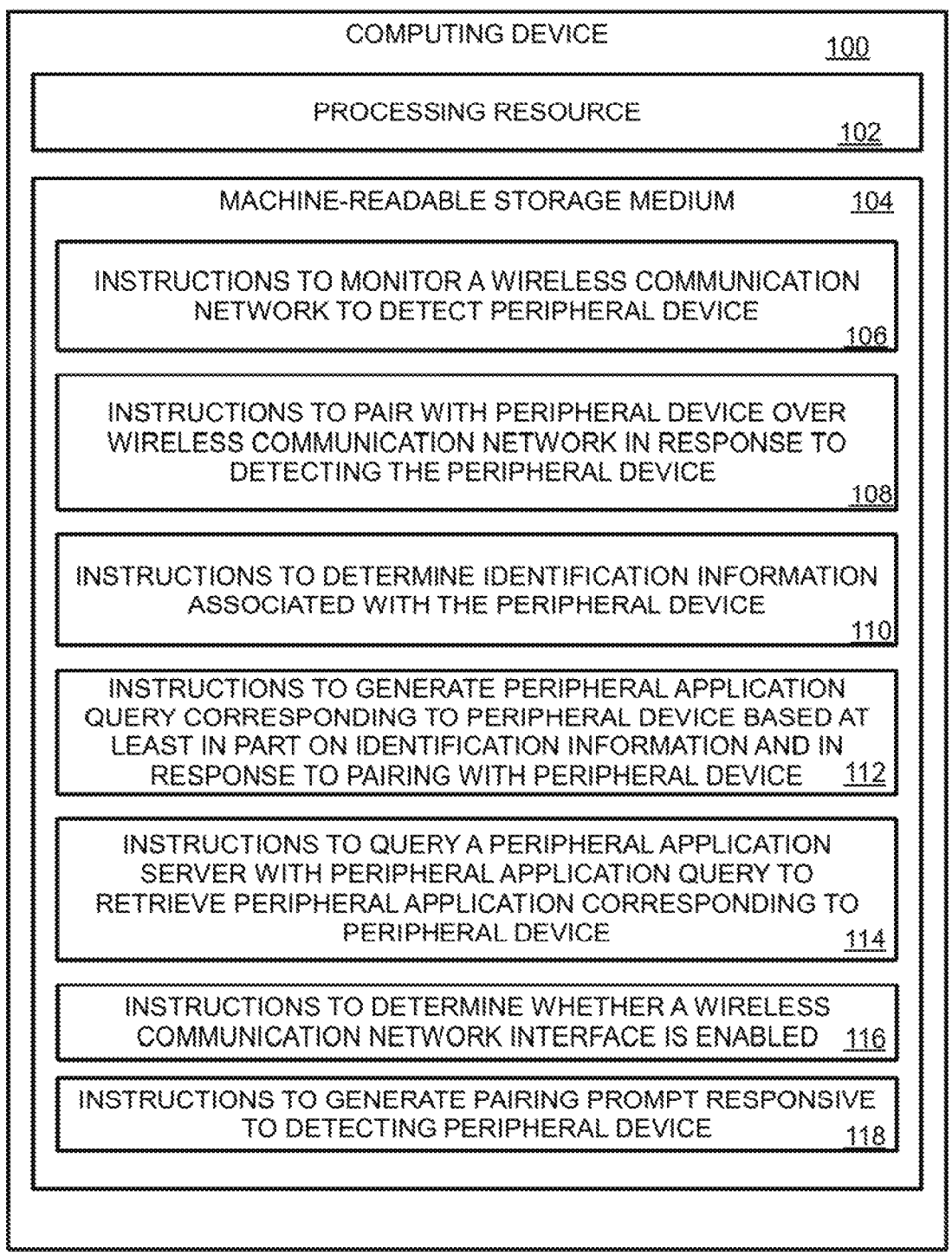
FIG. 1B is a block diagram of an example computing device.
Figure 1C:
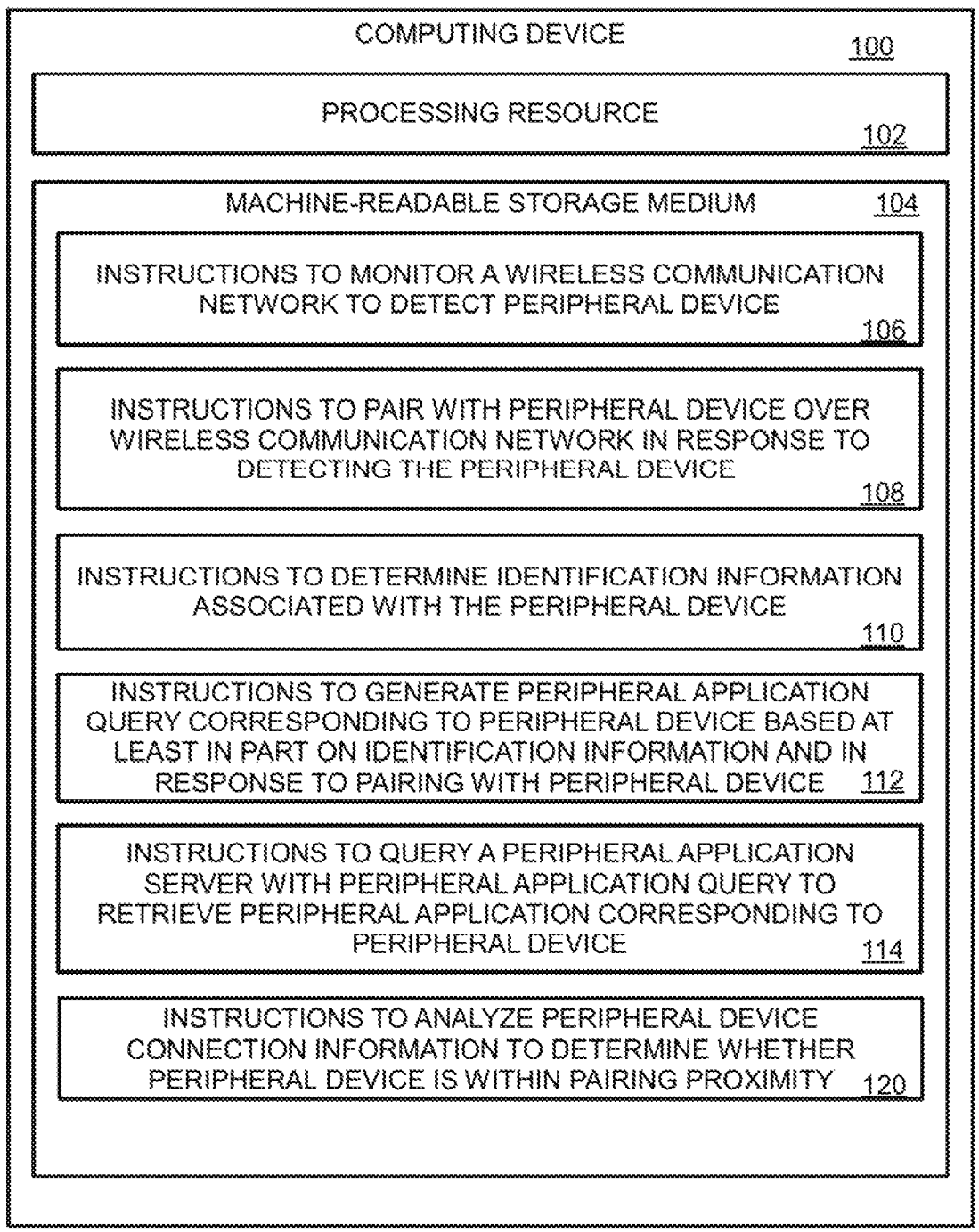
FIG. 1C is a block diagram of an example computing device.

Turning now to FIGS. 1A-C, these figures provide block diagrams that illustrate examples of a computing device 100. Examples of a computing device as disclosed herein include a personal computer, a portable electronic device (e.g., a smart phone, a tablet, a laptop, a wearable device, etc.), a workstation, smart device, server, a processing node of a server, a data center comprising a plurality of servers, a printing device, and/or any other such data processing devices. In the examples, the computing device 100 comprises a processing resource 102 and a machine-readable storage medium 104, which may be referred to as a memory and/or a memory resource. In the examples described herein, a processing resource 102 may include at least one hardware-based processor. Furthermore, the processing resource 102 may include one processor or multiple processors, where the processors may be configured in a single computing device 100 or distributed across multiple computing devices connected locally and/or remotely. As will be appreciated, a processing resource 102 may comprise one or more general purpose data processors and/or one or more specialized data processors. For example, the processing resource 102 may comprise a central processing unit (CPU), a graphics processing unit (GPU), an application-specific integrated circuit (ASIC), and/or other such configurations of logical components for data processing.

The machine-readable storage medium 104 may represent the random access memory (RAM) devices comprising the main storage of the example computing device 100, as well as any supplemental levels of memory, e.g., cache memories, non-volatile or backup memories (e.g., programmable or flash memories), read-only memories, etc. In addition, machine-readable storage medium 104 may be considered to include memory storage physically located elsewhere, e.g., any cache memory in a microprocessor, as well as any storage capacity used as a virtual memory, e.g., as stored on a mass storage device or on another computing device in communication with the example computing device 100. Furthermore, the machine-readable storage medium 104 may be non-transitory. In some examples, the processing resource 102 and machine-readable storage medium 104 may correspond to processing units and memory devices arranged in at least one server.

Generally, the machine-readable storage medium 104 may be encoded with and/or store instructions that may be executable by the processing resource 102, where execution of such instructions may cause the processing resource 102 and/or computing device 100 to perform the functionalities, processes, and/or sequences of operations described herein. In the example of FIGS. 1A-C, the machine-readable storage medium 104 comprises instructions to monitor a wireless communication network to detect a peripheral device 106; instructions to pair the computing device 100 with the peripheral device over the wireless communication network in response to detecting the peripheral device 108; instructions to determine identification information associated with the peripheral device 110; instructions to generate a peripheral application query corresponding to the peripheral device based at least in part on the identification information in response to pairing with the peripheral device 112; and instructions to query a peripheral application server with the peripheral application query to retrieve a peripheral application corresponding to the peripheral device 114.

In addition, as shown in the example computing device 100 of FIG. 1B, the machine-readable storage medium 104 may further comprise instructions to determine whether a wireless communication network interface is enabled for the computing device 116. In some examples, the machine-readable storage medium 104 may comprise instructions to generate a pairing prompt responsive to detecting the peripheral device 118. Furthermore, as shown in the example of FIG. 1C, the machine-readable storage medium 104 may further comprise instructions to analyze peripheral device connection information to determine whether the peripheral device is within a pairing proximity 120.

While not shown in FIGS. 1A-C, for interface with a user or operator, some example computing devices may include a user interface incorporating one or more user input/output devices, e.g., one or more buttons, a display, a touchscreen, a speaker, etc. The user interface may therefore communicate data to the processing resource and receive data from the processing resource. For example, a user may input one or more selections via the user interface, and the processing resource may cause data to be output on a screen or other output device of the user interface. Furthermore, the computing device may comprise a network interface device. Generally, the network interface device comprises one or more hardware devices to communicate data over one or more communication networks, such as a network interface card.

Figure 2:
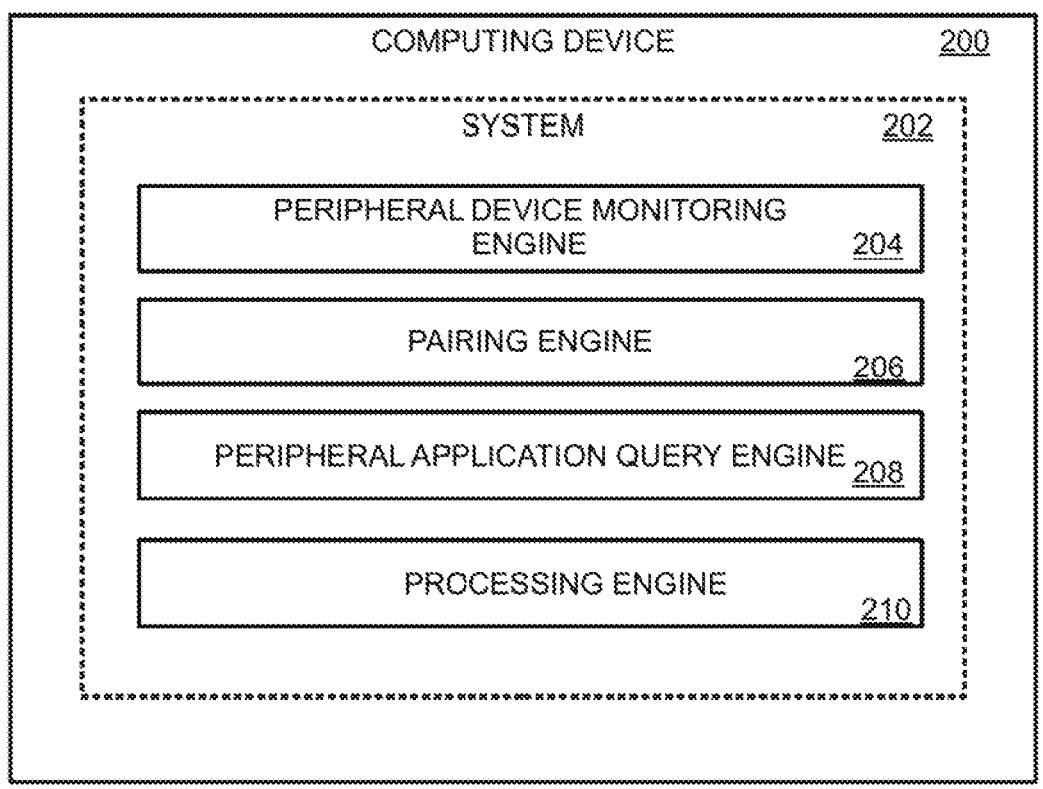
FIG. 2 is a block diagram of an example computing device.

FIG. 2 provides a block diagram of an example computing device 200. In the example, the computing device 200 comprises a system 202 including engines 204-210. Engines, as described herein, may be any combination of hardware and programming to implement the functionalities of the respective engines. In some examples described herein, the combinations of hardware and programming may be implemented in a number of different ways. For example, the programming for the engines may be processor executable instructions stored on a non-transitory machine-readable storage medium and the hardware for the engines may include a processing resource to execute those instructions. In these examples, a computing device implementing such engines may include the machine-readable storage medium storing the instructions and the processing resource to execute the instructions, or the machine-readable storage medium may be separately stored and accessible by the computing device and the processing resource. In some examples, engines may be implemented in circuitry. Moreover, processing resources used to implement engines may comprise one or more central processing units (CPU), one or more graphics processing units (GPU), one or more application specific integrated circuits (ASICs), and/or other such types of logical components that may be implemented for data processing.

In the example computing device 200 of FIG. 2, the computing device 200 includes a peripheral device monitoring engine 204 to monitor a wireless communication network to detect a peripheral device. In addition, the computing device 200 includes a pairing engine 206 to pair the computing device with the peripheral device responsive to detecting the peripheral device. The computing device 200 further comprises a peripheral application query engine 208 to, responsive to pairing the computing device to the peripheral device, generate a peripheral application query corresponding to the peripheral device. The peripheral application query engine is further to query a peripheral application server based on the peripheral application query to retrieve a peripheral application corresponding to the peripheral device. Furthermore, the computing device 200 includes a processing engine 210 to execute the peripheral application responsive to retrieving the peripheral application.

Figure 3:
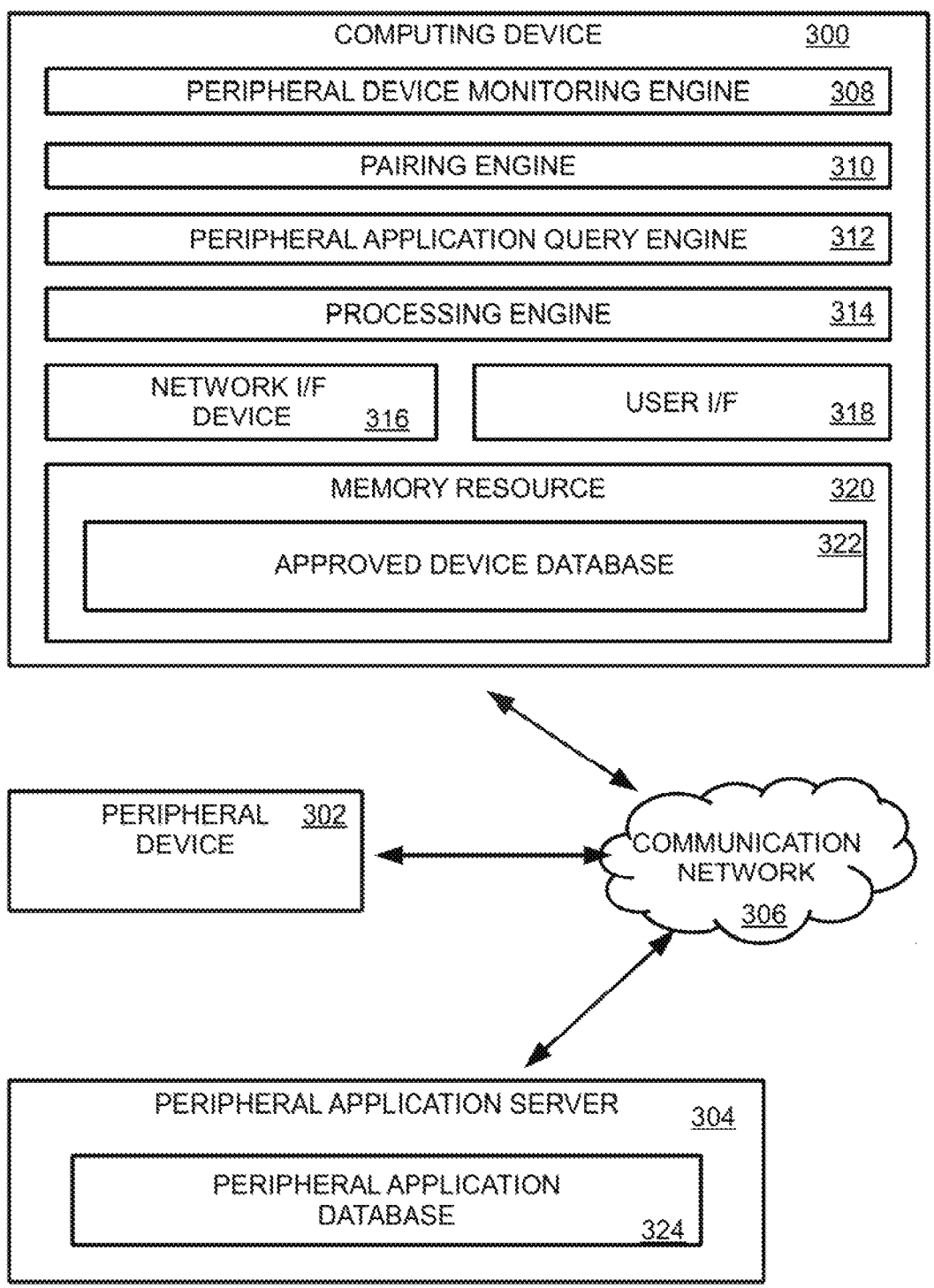
FIG. 3 is a block diagram of an example implementation of an example computing device, an example peripheral device, and an example peripheral application server.

FIG. 3 provides a block diagram of an example implementation of an example computing device 300, an example peripheral device 302, and an example peripheral application server 304. In this example, the computing device 300, peripheral device 302, and peripheral application server 304 may be in communication over a communication network 306. Generally, the communication network 306 may comprise the Internet, a local area network (LAN), a wide area network (WAN), a cellular voice/data network, a personal area network (PAN) (e.g., Bluetooth network, wireless USB network, IrDA network, ZigBee network, etc.), one or more high speed bus connections, and/or other such types of communication networks. As will be appreciated, in some examples the communication network 306 may generally comprise a combination of one or more types of communication networks. In some examples, the wireless communication network through which the computing device may pair with a peripheral device may comprise a wireless PAN (e.g., a Bluetooth network), a wireless LAN network (e.g., Wi-Fi network), and/or other such types of wireless communication networks.

In the example implementation shown in FIG. 3, the computing device 300 comprises a peripheral device monitoring engine 308 to monitor the communication network 306 to detect a peripheral device 302 for pairing. In response to detecting the peripheral device 302, a pairing engine 310 of the computing device 300 pairs the computing device 300 with the peripheral device 302. In response to pairing the computing device 300 and the peripheral device 302, a peripheral application query engine 312 of the computing device 300 generates a peripheral application query corresponding to the peripheral device 302. In addition, the peripheral application query engine 312 queries the peripheral application server 304 over the communication network 306 based at least in part on the peripheral application query to retrieve a peripheral application corresponding to the peripheral device 302. In response to retrieving the peripheral application, a processing engine 314 of the computing device 300 executes the peripheral application such that interfacing between the paired computing device 300 and peripheral device 302 is facilitated.

As shown in the example of FIG. 3, the computing device 300 further includes a network interface device 316. Generally, the network interface device 316 comprises one or more hardware devices to communicate data over one or more communication networks, such as a network interface card. For example, the network interface device 316 comprises hardware devices for communication over a Bluetooth network (e.g., a Bluetooth network adapter), a wireless communication network (e.g., a Wi-Fi adapter), and/or communication over a wired communication network (e.g., a LAN adapter). As will be appreciated, the network interface device 316 may comprise various implementations of hardware devices. In some examples, the network interface device 316 and/or some component hardware devices thereof may be enabled/disabled to turn on/off communication over the communication network 306.

In addition, the computing device 300 comprises a user interface 318. Generally, the user interface 318 incorporates one or more user input/output devices, e.g., one or more buttons, a display, a touchscreen, a speaker, etc. The user interface may therefore communicate data to the processing resource and receive data from the processing resource. For example, a user may input one or more selections via the user interface, and the processing resource may cause data to be output on a screen or other output device of the user interface. In some examples, the computing device 300 may generate a pairing prompt at the computing device for output to a user with the user interface 318. In these examples, a user may be prompted to confirm pairing with the peripheral device 302 prior to pairing of the computing device 300 and the peripheral device 302. A user may input a pairing confirmation corresponding to the pairing prompt, and responsive to receiving the pairing confirmation, the computing device 300 may proceed with pairing the computing device 300 and peripheral device 302.

Furthermore, in this example, the computing device 300 comprises a memory resource 320 storing an approved device database 322. The memory resource 320 may comprise random access memory (RAM) devices comprising the main storage of the example computing device 300, as well as any supplemental levels of memory, e.g., cache memories, non-volatile or backup memories (e.g., programmable or flash memories), read-only memories, etc. In addition, memory resource 320 may be considered to include memory storage physically located elsewhere, e.g., any cache memory in a microprocessor, as well as any storage capacity used as a virtual memory, e.g., as stored on a mass storage device or on another computing device in communication with the example computing device 300. Furthermore, the memory resource 320 may be non-transitory.

The approved device database 322 generally stores information regarding various peripheral devices approved for automatic/dynamic pairing and automatic execution of corresponding peripheral applications. In some examples, the approved device database 322 includes manufacturer/vendor information that indicates vendors of peripheral devices approved for streamlined pairing. In some examples, the approved device database 322 includes product information for various products approved for streamlined pairing. Generally, the approved device database 322 may be arranged with any database organization and/or structure including, but not limited to, a relational database, a hierarchical database, a network database, and/or combinations thereof. A database management system in the form of a an application executing as instructions on a processing resource of the computing device 300 may be used to access the information or data stored in records of the database 322 in response to a query, where a query may be dynamically determined and executed by the computing device and/or an engine thereof.

For example, prior to pairing the peripheral device 302 with the computing device 300, the pairing engine 310 may generate a query for the approved device database 322 based at least in part on identification information associated with the peripheral device 302 to determine whether the peripheral device 302 is approved for pairing with the computing device 300. In such examples, the identification information may comprise a vendor identifier and a product identifier associated with the peripheral device 302. The pairing engine 310 may query the approved device database 322 based at least in part on the vendor identifier and the product identifier to determine whether the peripheral device 302 is approved for pairing and/or automatic retrieval and execution of a peripheral application corresponding to the peripheral device 302.

In addition, the example peripheral application server 304 comprises a peripheral application database 324, where the peripheral application database 324 generally stores peripheral applications corresponding to various types of peripheral devices. In some examples, the peripheral application database may store peripheral applications based at least in part on a vendor identifier and/or a product identifier of peripheral devices. For example, the peripheral applications stored in the peripheral application database 324 may be stored with file names based at least in part on the vendor identifier and/or the product identifier. As discussed, the peripheral application query engine 312 of the computing device 300 may generate a peripheral application query corresponding to the peripheral device 302 with which to query the peripheral application server 304 and the peripheral application database 324 thereof to retrieve a peripheral application corresponding to the peripheral device 302. In some examples, the peripheral application query engine 312 may determine identification information (e.g., a vendor identifier and/or a product identifier) for the peripheral device 302, and the peripheral application query engine 312 may generate a file name based at least in part on the identification information. The peripheral application server 304 and the peripheral application database 324 thereof may be queried based at least in part on the file name.

The example implementation provided in FIG. 3 generally illustrates one peripheral device 302 and one peripheral application server 304. However, it will be appreciated, that other examples may include one or more peripheral devices 302 and/or peripheral application servers 304. Therefore, the operations generally described with respect to the example implementation may be performed concurrently for a plurality of peripheral devices 302 via communication with a plurality of peripheral application servers 304.

For example, a Bluetooth mouse and a Bluetooth keyboard may be concurrently paired with a computing device. In this example, the peripheral application corresponding to the Bluetooth mouse and the peripheral application corresponding to the Bluetooth keyboard may be concurrently retrieved and executed as described herein. Similarly, in a smart home application, a plurality of smart home devices may be detected concurrently by a computing device over a communication network (such as a home network with Wi-Fi and/or Ethernet connections). The computing device may concurrently pair with each of the plurality of smart home devices. The computing device may generate a peripheral application query for each of the smart home devices. The computing device may query one or more respective peripheral application servers with the peripheral application queries to retrieve a peripheral application corresponding to each smart home device, and the computing device may execute each peripheral application for each smart home device concurrently.

Figure 4:
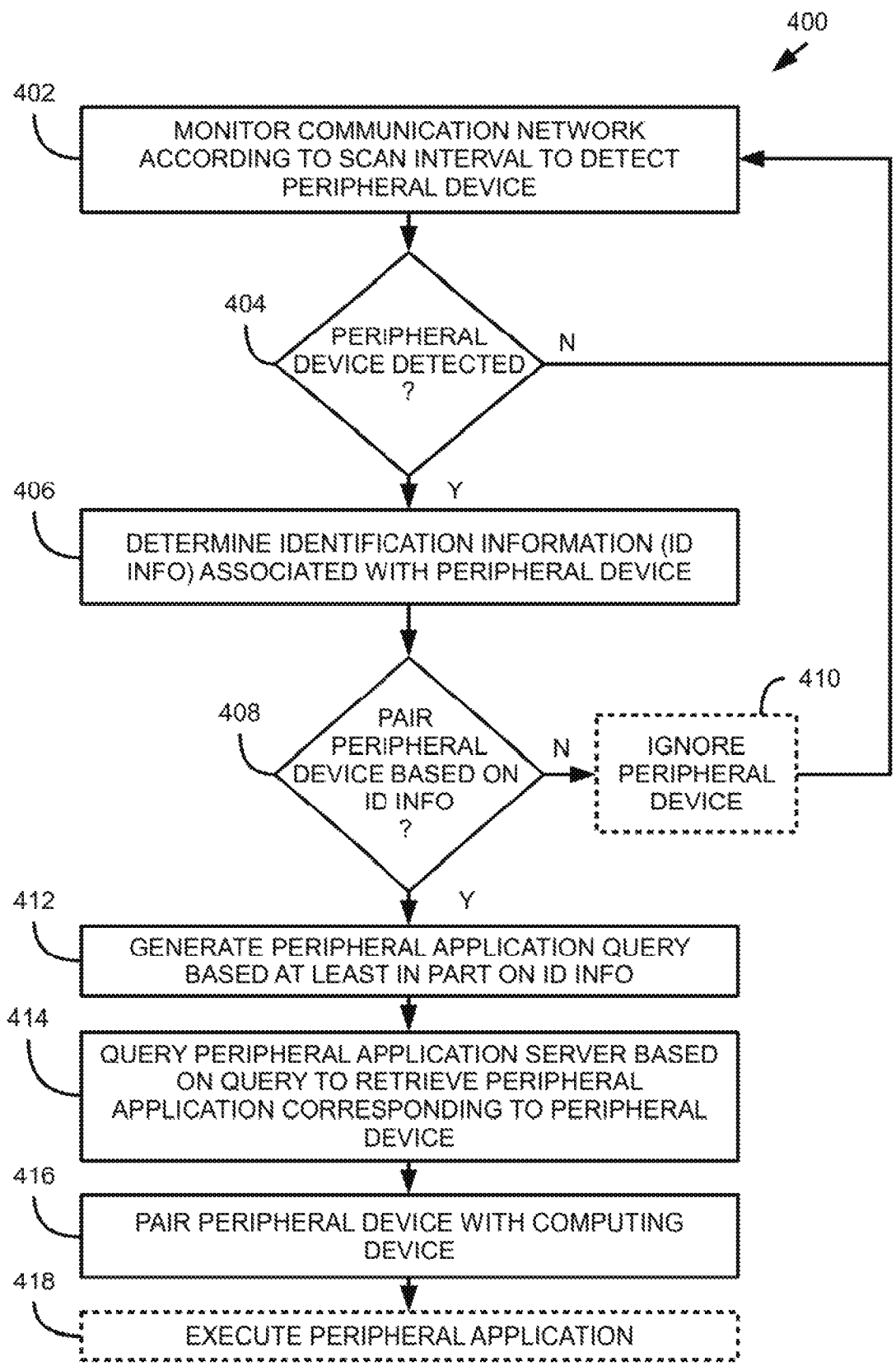
FIG. 4 is a flowchart that illustrates an example sequence of operations that may be performed by an example computing device.
Figure 5:
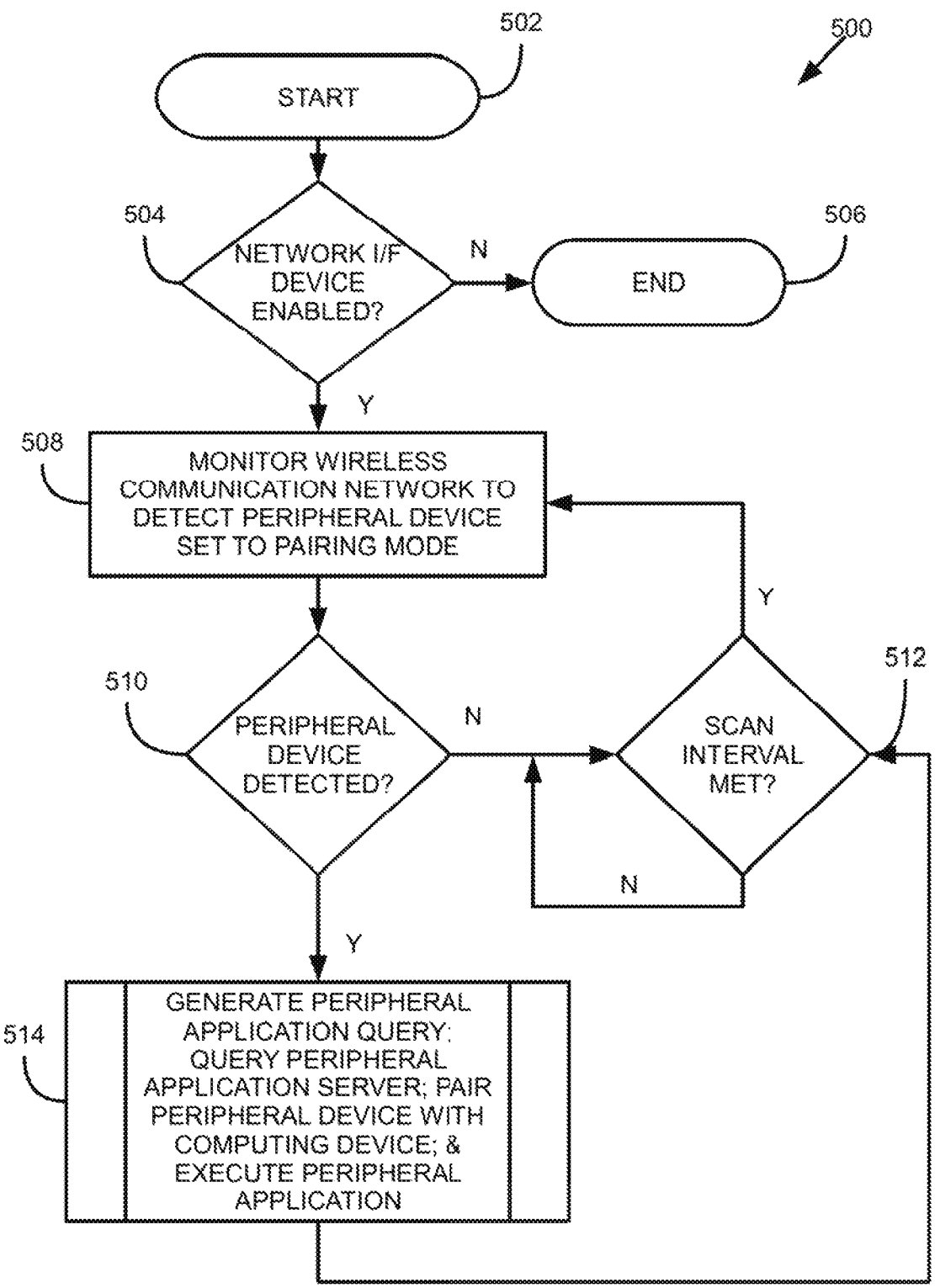
FIG. 5 is a flowchart that illustrates an example sequence of operations that may be performed by an example computing device.
Figure 6:
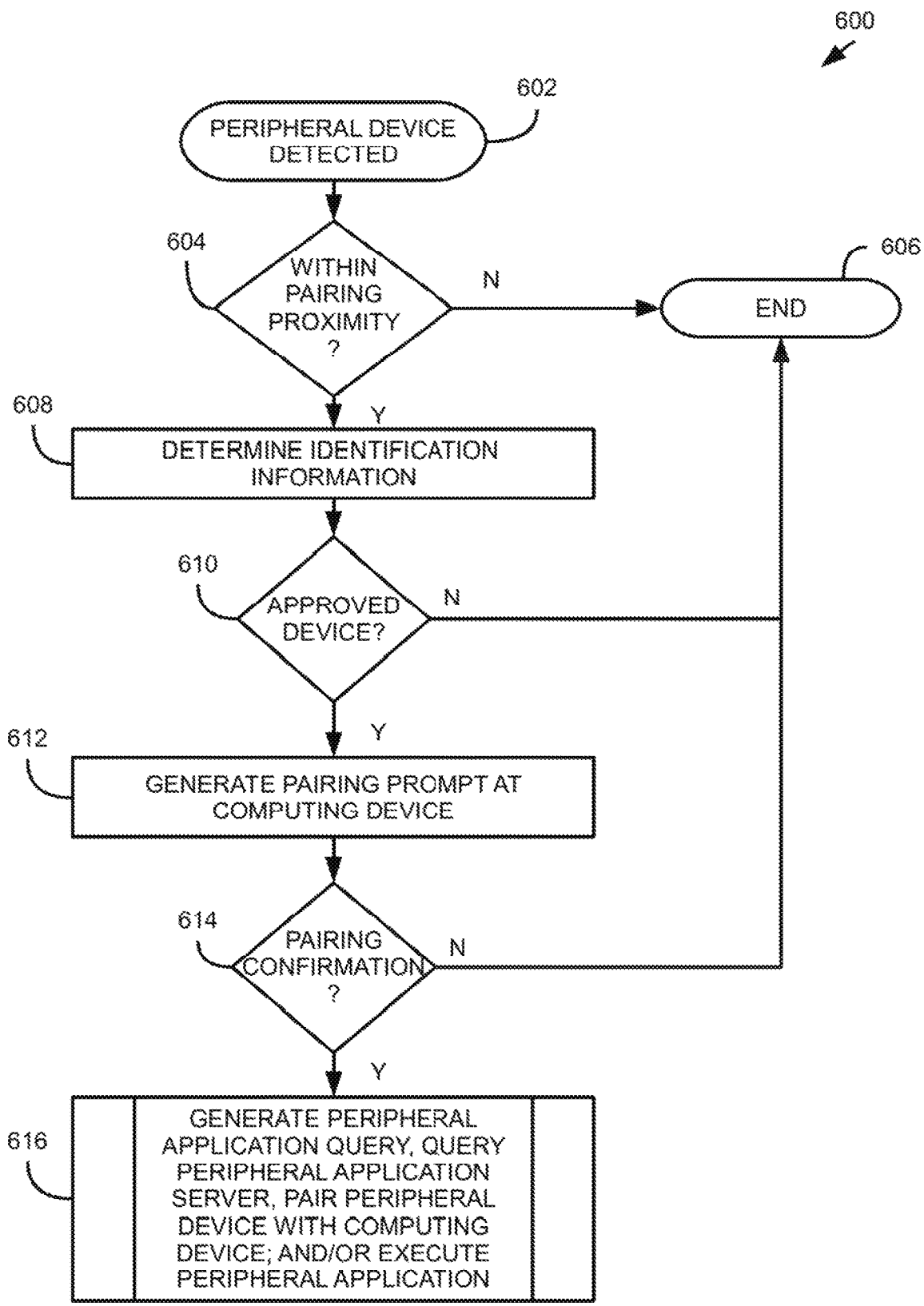
FIG. 6 is a flowchart that illustrates an example sequence of operations that may be performed by an example computing device.

FIGS. 4-6 provide flowcharts that provide example sequences of operations that may be performed by an example computing device and/or a processing resource thereof to perform example processes and methods. In some examples, the operations included in the flowcharts may be embodied in a memory resource (such as the example machine-readable storage mediums 104 of FIGS. 1A-C) in the form of instructions that may be executable by a processing resource to cause the computing device (e.g., the computing device 100 of FIGS. 1A-C, the computing devices 200, 300 of FIGS. 2-3, etc.) to perform the operations corresponding to the instructions. Additionally, the examples provided in FIGS. 4-6 may be embodied in computing devices, machine-readable storage mediums, processes, and/or methods. In some examples, the example processes and/or methods disclosed in the flowcharts of FIGS. 4-6 may be performed by one or more engines implemented in a computing device, such as the example engines 204-210, 308-314 of FIGS. 2 and 3.

Turning now to FIG. 4, this figure provides a flowchart 400 that illustrates an example sequence of operations that may be performed by an example computing device to pair a peripheral device with the computing device. The computing device monitors a communication network according to a scan interval to detect a peripheral device for pairing with the computing device (blocks 402-404). In some examples, a scan interval may be implemented for the computing device such that the computing device is not constantly monitoring a communication network for peripheral devices (which may lead to high energy usage and/or shortened battery life). The scan interval may be a defined time, such as 30 seconds, 1 minute, 5 minutes, etc. Generally, the scan interval may be based at least in part on application of the computing device and/or peripheral devices. While the computing device does not detect any peripheral devices for pairing ("N" branch of block 404), the computing device continues monitoring the communication network according to the scan interval (block 402). In some examples, the computing device may detect a peripheral device by detecting a broadcast packet generated by the peripheral device and communicated on the communication network. In other examples, the computing device may detect the peripheral device connected to the communication network by scanning the network.

In response to detecting a peripheral device for pairing ("Y" branch of block 404), the computing device determines identification information associated with the peripheral device (block 406). As discussed previously, identification information may comprise a vendor identifier and/or a product identifier. The vendor and/or product identifiers may be unique alphanumeric identifiers that may be used to identify the type of peripheral device. Generally, identification information may be communicated from the peripheral device to the computing device upon detection of the peripheral device by the computing device. Based on the identification information, the computing system determines whether to pair the peripheral device with the computing system (block 408). In some examples, the computing system may query an approved device database based at least in part on the identification information to determine whether to pair the peripheral device with the computing system.

In response to determining not to pair the peripheral device with the computing device ("N" branch of block 408), the computing system may ignore the peripheral device (block 410), and the computing system may continue monitoring the communication network for other peripheral devices (block 402).

In response to determining to pair the peripheral device with the computing device ("Y" branch of block 408), the computing device generates a peripheral application query associated with the peripheral device based at least in part on the identification information (block 412). For example, if a peripheral device has a vendor identifier of 0x3F0 and a product identifier of 0x064C, the computing device may determine that a peripheral application having a file name including 03F0064C should be retrieved, and the computing device may generate a peripheral application query associated with the file name. As will be appreciated, various correlations between a vendor identifier and/or product identifier may be implemented for retrieving a corresponding peripheral application.

The computing device queries a peripheral application server based on the peripheral application query to retrieve a peripheral application corresponding to the peripheral device (block 414), and the computing device pairs the peripheral device with the computing device (block 416). In some examples, the computing device may execute the peripheral application responsive to retrieving the peripheral application (block 418).

) FIG. 5 provides a flowchart 500 that illustrates an example sequence of operations that may be performed by a computing device. In this example, the computing device starts (block 502) the example sequence of operations by determining whether a network interface device of the computing device is enabled (block 504). In some example computing devices, a network interface device may be disabled, such that pairing with a peripheral device may not occur. As will be appreciated, enabling/disabling a network interface device may reduce energy usage and/or increase battery life. Therefore, in some examples, if the network interface device is disabled ("N" branch of block 504), the sequence of operations may end (block 506).

In response to determining that the network interface device is enabled ("Y" branch of block 504), the computing device may monitor a wireless communication network to detect a peripheral device set to a pairing mode (blocks 508-510). In some examples, a peripheral device may be set to a pairing mode, which may indicate that the peripheral device is available for connection/interface with a computing device. Furthermore, when a peripheral device is paired with a first computing device, some types of peripheral devices may not be available for pairing with a second computing device. Therefore, peripheral devices not set to a pairing mode may be ignored by the computing device in examples such as the example of FIG. 5.

If a peripheral device in pairing mode is not detected ("N" branch of block 510), the computing device may determine if a scan interval has been met (block 512). As discussed previously, a scan interval may be a defined time according to which the computing device may scan a communication network to detect peripheral devices for pairing. In this example, therefore, the computing device may not monitor the wireless communication network ("N" branch of block 512) until the scan interval is met. In response to determining that the scan interval has been met ("Y" branch of block 512), the computing device may monitor the wireless communication network to detect a peripheral device for pairing (block 508).

In response to detecting a peripheral device set to pairing mode ("Y" branch of block 510), the computing device may generate a peripheral application query associated with the peripheral device; query a peripheral application server with the peripheral application query to retrieve a peripheral application corresponding to the peripheral device; pair the peripheral device with the computing device; and execute the peripheral application as described herein (block 514).

Turning now to FIG. 6, this figure provides a flowchart 600 that illustrates an example sequence of operations that may be performed by a computing device. In this example, a peripheral device is detected (block 602), and the computing device determines whether the peripheral device is within a pairing proximity (block 604). Generally, a pairing proximity may be a defined value and/or approximation set at the computing system. A pairing proximity may indicate an approximate distance from the computing device in which peripheral devices should be positioned.

As will be appreciated, however, locational information associated with the computing device and/or peripheral device may not be exact. In particular in some examples, locational/positional information for a computing device and/or peripheral device may be estimated based on other characteristics (such as connection information of the computing device or peripheral device with the communication network). For example, a position of the computing device and/or peripheral device may be approximated based on a connection to a wireless communication network. In some examples, determining whether the peripheral device is within a pairing proximity may be based at least in part on peripheral device connection information associated with the peripheral device.

In some examples, the computing device may analyze a signal strength associated with the connection to the peripheral device over the communication network. In these examples, a peripheral device having a low signal strength and/or a weak connection may be determined to not be within a pairing proximity. In turn, a peripheral device having a high signal strength and/or a good connection may be determined to be within a pairing proximity. In some examples, based on communication network connection devices (such as routers, cellular data towers, etc.), a position of a computing device and/or peripheral device may be determined based at least in part on a position of the computing device and/or peripheral device relative to the network connection devices. For example, positional information for a computing device and a peripheral device may be determined by triangulation based on a position of two or more Wi-Fi routers in a home. As will be appreciated, based on location/positional information determined from peripheral device connection information, examples may determine whether a peripheral device is within a pairing proximity of the computing device.

In response to determining that the peripheral device is not within the pairing proximity ("N" branch of block 604), the sequence of operations ends (block 606). In response to determining that the peripheral device is within pairing proximity ("Y" branch of block 604), the computing device determines identification information associated with the computing device (block 608). As discussed, in some examples, identification information may comprise a vendor identifier and/or a product identifier. Based on the identification information, the computing device determines whether the peripheral device is an approved device for pairing with the computing device (block 610).

In response to determining that the peripheral device is not a device approved for pairing with the computing system ("N" branch of block 610), the sequence of operations ends (block 606). In response to determining that the peripheral device is a device approved for pairing with the computing device ("Y" branch of block 610), the computing device generates a pairing prompt at the computing device (block 612). Generating the pairing prompt may include outputting the pairing prompt with a user interface device (such as a display or touchscreen). Furthermore, generating the pairing prompt may be based at least in part on the identification information associated with the peripheral device. For example, the pairing prompt may be generated based at least in part on a vendor identifier and/or a product identifier of the peripheral device. In this example, the computing device waits for a response to the pairing prompt (block 614). In some examples, a user may confirm pairing with the peripheral device via a user interface device (e.g., a touchscreen, a mouse, a keyboard, etc.). Based on an input by a user, a pairing confirmation or a pairing rejection may be received by the computing device for the pairing prompt. In response to not receiving a pairing confirmation (i.e., receiving a pairing rejection) ("N" branch of block 614), the example sequence of operations ends (block 606).

In response to receiving a pairing confirmation ("Y" branch of block 614), the computing device may dynamically generate a peripheral application query based at least in part on the identification information associated with the peripheral device; query a peripheral application server based on the peripheral application query to retrieve a peripheral application corresponding to the peripheral device; pair the peripheral device with the computing device; and/or execute the peripheral application responsive to pairing the peripheral device with the computing device as described herein (block 616).

Accordingly, as described herein, examples may dynamically/automatically pair a peripheral device with a computing device. In such examples, the computing device dynamically generates a peripheral application query for retrieving a corresponding peripheral application for a peripheral device, and the computing device may automatically execute a retrieved peripheral application for a peripheral device. As will be appreciated, the detection, pairing, and automatic execution of a peripheral application for a peripheral device may be referred to as streamlined pairing of a peripheral device. Examples provided herein generally reduce manual input needed from a user for pairing peripheral devices, retrieving corresponding peripheral applications, and executing corresponding peripheral applications. Moreover, examples provided herein may reduce peripheral application associated distribution and access issues. Furthermore, some examples may facilitate automated pairing and interfacing with one or more peripheral devices. In addition, examples provided herein facilitate automated pairing and interfacing with peripheral devices not previously paired with a computing device. In some examples, some peripheral devices may be approved for automated pairing and interfacing as described herein based at least in part on a vendor and/or particular product of the peripheral device. For example, some specific Bluetooth keyboards, Bluetooth mice, Wi-Fi devices, etc. may be approved for automated pairing and interfacing with a computing device upon detection of such devices.

In addition, while various examples are described herein, elements and/or combinations of elements may be combined and/or removed for various examples contemplated hereby. For example, the example operations provided herein in the flowcharts of FIGS. 4-6 may be performed sequentially, concurrently, or in a different order. Moreover, some example operations of the flowcharts may be added to other flowcharts, and/or some example operations may be removed from flowcharts. Furthermore, in some examples, various components of the example computing devices of FIGS. 1A-C and 2-3 may be removed, and/or other components may be added. Similarly, in some examples various instructions of the example memories and/or machine-readable storage mediums of FIGS. 1A-C may be removed, and/or other instructions may be added (such as instructions corresponding to the example operations of FIGS. 4-6).

The preceding description has been presented to illustrate and describe examples of the principles described. This description is not intended to be exhaustive or to limit examples to any precise form disclosed. Many modifications and variations are possible in light of this description.

The invention claimed is:

1. A non-transitory machine readable storage medium comprising instructions executable by a processing resource to cause a computing device to:
   determine whether a peripheral device is within a pairing proximity of the computing device by:
      monitoring a wireless communication network to detect the peripheral device by analyzing a signal strength associated with a connection to the peripheral device over the wireless communication network; and
      determining a position of the computing device and the peripheral device;
   determine identification information associated with the peripheral device;
   determine whether to pair the peripheral device with the computing device based on:
      the identification information;
      the signal strength;
      the position of the computing device and the peripheral device; and
      whether the peripheral device is set to a pairing mode;
   in response to pairing with the peripheral device, generate a peripheral application query corresponding to the peripheral device based at least in part on the identification information; and
   query a peripheral application server with the generated peripheral application query to retrieve a peripheral application corresponding to the peripheral device from the peripheral application server.

2. The non-transitory machine readable storage medium of claim 1 further comprising instructions to cause the computing device to:
   determine whether a wireless communication network interface of the computing device is enabled,
   wherein the instructions cause the computing device to monitor the wireless communication network, pair with the peripheral device, determine the identification information associated with the peripheral device, generate the peripheral application query, and query the peripheral application server responsive to determining that the wireless communication network interface of the computing device is enabled.

3. The non-transitory machine readable storage medium of claim 1 further comprising instructions to cause the computing device to:
   generate a pairing prompt at the computing device responsive to detecting the peripheral device set to pairing mode,
   wherein the instructions cause the computing device to pair with the peripheral device, generate the peripheral application query, and query the peripheral application server are responsive to receiving a pairing confirmation corresponding to the pairing prompt.

4. The non-transitory machine readable storage medium of claim 1, further comprising instructions to cause the computing device to pair with the peripheral device, generate the peripheral application query, and query the peripheral application server responsive to determining that the peripheral device is within the pairing proximity of the computing device.

5. The non-transitory machine readable storage medium of claim 1, wherein the peripheral device is determined to be within the pairing proximity based on the peripheral device having a high signal strength.

6. The non-transitory machine readable storage medium of claim 1, further comprising instructions to cause the computing device to:
   in response to retrieving the peripheral application, execute the peripheral application.

7. The non-transitory machine readable storage medium of claim 1, wherein the identification information comprises a manufacturer identifier and a product identifier, and the instructions to generate the peripheral application query comprise instructions to cause the computing device to:
   generate the peripheral application query based at least in part on the manufacturer identifier and the product identifier.

8. A computing device comprising:
   a processing resource; and
   a memory resource storing non-transitory machine readable instructions to cause the processing resource to:
      determine whether a peripheral device is within a pairing proximity of the computing device by:

monitoring a wireless communication network to detect the peripheral device by analyzing a signal strength associated with a connection to the peripheral device over the wireless communication network; and determining a position of the computing device and the peripheral device;

determine identification information associated with the peripheral device;

determine whether to pair the peripheral device with the computing device based on:
the identification information;
the signal strength;
the position of the computing device and the peripheral device; and
whether the peripheral device is set to a pairing mode, wherein the peripheral device has not been previously paired with the computing device;

responsive to pairing the computing device with the peripheral device:
generate a peripheral application query corresponding to the peripheral device; and
query a peripheral application server based on the generated peripheral application query to retrieve a peripheral application corresponding to the peripheral device from the peripheral application server; and execute the peripheral application responsive to retrieving the peripheral application.

9. The computing device of claim 8, including instructions to cause the processing resource to detect a broadcast packet of the peripheral device communicated on the wireless communication network.

10. The computing device of claim 8, including instructions to cause the processing resource to monitor the wireless communication network based on a peripheral device scan interval.

11. The computing device of claim 8, further comprising:
a network interface device; and
including instructions to cause the processing resource to monitor the wireless communication network responsive to the network interface device being enabled.

12. A method comprising:
determining whether the peripheral device is within a pairing proximity of the computing device by:
monitoring, with a processing resource of a computing device, a wireless communication network according to a scan interval to detect a peripheral device for pairing with the computing device in response to a network interface device being enabled by analyzing, with the computing device, a signal strength associated with a connection to the peripheral device; and
determining a position of the computing device and the peripheral device by triangulation with a plurality of routers;

in response to detecting the peripheral device for pairing with the computing device, determining identification information associated with the peripheral device;

determining whether to pair the peripheral device with the computing device based on:
the identification information associated with the peripheral device;
the signal strength;
the position of the computing device and the peripheral device; and
whether the peripheral device is set to a pairing mode, wherein the peripheral device has not been previously paired with the computing device;

in response to determining to pair the peripheral device with the computing device:
generating a peripheral application query based at least in part on the identification information associated with the peripheral device;
querying a peripheral application server based on the generated peripheral application query to retrieve a peripheral application corresponding to the peripheral device from the peripheral application server; and
pairing the peripheral device with the computing device.

13. The method of claim 12, wherein the identification information associated with the peripheral device comprises a vendor identifier and a product identifier, and determining whether to pair the peripheral device with the computing device is based at least in part on the vendor identifier, the product identifier, and an approved device database associated with the computing device.

* * * * *